Patented Mar. 27, 1951

2,546,868

UNITED STATES PATENT OFFICE 2,546,868

PROCESS OF MAKING CLOSED CELL CELLULAR SOFT RUBBER SHEET BY SINGLE VULCANIZATION AND EXTERNAL GASSING

Hans Pfleumer, New Brunswick, N. J., assignor to Rubatex Products, Inc., New York, N. Y., a corporation of Delaware No Drawing. Application October 14, 1947,
Serial No. 779,836

4 Claims. (Cl. 18—53)

My present invention relates to closed cell soft cellular rubber in which an internal cellular structure is formed having a multiplicity of cells, the majority of which are non-communicating.

This species of rubber is well known as disclosed in Patents Nos. 2,268,621, 2,310,926, 2,283,-316, 2,296,305, 2,412,072 and 2,421,831.

In the formation of closed cell soft cellular rubber in sheets or in other molded forms, the steps comprise essentially the mixing of rubber compound with a small amount of sulphur as the vulcanizing agent and preparing the compound for expansion in an autoclave by nitrogen gas, that is, the rubber mix was placed in a chamber in which nitrogen gas at high pressure was admitted, the pressures reached being of the order of three thousand pounds per square inch.

Prior to placement in the autoclave, the rubber mix was precured or given a partial vulcanization in order to impart sufficient tensile strength to the cell walls when formed so that they will not burst into a spongy mass when expanded.

After the sheet was impregnated with gas at elevated pressure, the external gas pressure was relaxed and the internal gas pressure within the rubber causing expansion of the sheet by the blowing of a multiplicity of minute bubbles.

Thereafter, the sheet was trimmed to the correct width and given a final vulcanization operation between steam platens to form a finished sheet.

My invention is directed primarily to the elimination of subsequent finishing cure by vulcanizing first and gassing subsequently.

An object of my invention, therefore, is the provision of a novel method for forming soft vulcanized closed cell cellular sheet by a single vulcanization and subsequent external gassing and expansion.

My invention will best be understood from the following specific description in which a comparison is made between my novel process and prior processes.

Heretofore in the production of closed cell cellular rubber, the following steps were performed:

1. Mixing the rubber compound,
2. Calendering the mix and building it up by plying into a solid sheet of required gage,
3. Resting the solid sheet to regain the lost tensile during mastication,
4. Precuring the solid sheet between steam-heated platens,
5. Gassing the precured solid sheet in a gassing chamber with nitrogen gas a required time, according to gage,
6. Removing the sheet from gassing chamber and letting it expand by itself,
7. Trimming the partially expanded sheet to correct width and length in order to fill the finishing mold,
8. Vulcanizing the sheet between steam-heated platens to a finish-cured sheet.
9. Removing the expanded and soft-cured sheet from the platen press for further disposal.

This process, although successful, is a rather lengthy one and entails considerable expense, increasing the cost of manufacture.

Some of the difficulties previously encountered in the performance of prior processes are:

(a) That after step 6 the sheet must be trimmed in order to provide the proper size for the finishing mold. Evidently, this causes a loss of already precured and gassed material for which further use is hard to find.

(b) The possibility exists that a gassed sheet having a slight undercure collapses during the finishing cure causing a complete loss of the sheet.

(c) The possibility exists that during the finishing cure not directly a collapsed sheet results but an inferior sheet with collapsed corners or airbell blisters, etc.

(d) The sheet also may be of a soggy, non-resilient nature without snap.

(e) Internally, irregular structure may exist induced by mixing and calendering and exaggerated by the finishing cure.

This is caused by a reheating in the press for finishing cure. Apparently, the only partially vulcanized rubber cell structure cannot stand the extreme heat necessary for a finishing cure. Another contributing factor is the inherent capacity of the expanded sheet to resist heat transfer towards the inner portions of the sheet. The fact of the matter is that it does break down into a sheet having a skin of varying thickness on the sides that were in contact with the hot press platens. The cell layers adjoining the skin show an empty, spongy structure while in the central portion of the sheet, the cells are closed and filled with gas.

This above-described condition is emphasized with diminishing thickness of the finished sheet. On the other hand, a thick sheet, being in itself a poor thermal conductor, opposes the proper heat penetration towards the center of the sheet and in the meantime the outer portions are still more destroyed.

In the process I propose all of these difficulties are eliminated.

1. The process is shortened,
2. Trimming waste is done away with,

3. Finishing press platens and molds are unnecessary.

The finished sheet will not have a perfectly smooth skin as before because artifical skin is not produced, but the cell structure extends towards the outer limits. It may even show a slight roughness, and the edges may not be perfectly straight (which latter can, of course, be corrected by slight trimming). If called for, a pattern can be pressed into the finished sheet superficially with high heat and short time (10 to 20 seconds).

In the process I propose the first five steps are retained with some variations and the 7th, 8th, and 9th steps are entirely done away with.

Consequently, the complete vulcanization or cure occurs in the fourth step and may, therefore be termed "Pre-gassing one stage vulcanization." The whole procedure would be as follows:

1. Mixing rubber compound. I propose to break down the rubber more than is necessary for the 9-step process. The aim is to give the compound more stretch even after full vulcanization. In this respect, a great deal can be done by careful selection and blending of rubber.

2. This step will require no change but will be improved materially by increasing stretch of rubber which overcomes the tendency of the solid rubber sheet to contract to a thicker gage on the calender rolls.

3. This step will depend on compound and procedure as of now.

4. In step 4, as mentioned before, the vulcanization is extended to the point where soft vulcanized rubber (about 5% sulphur bond) is realized. However, after step 4 the rubber will still be in stretch condition due to the thorough mastication of the rubber.

5. In the final step 5 the vulcanized sheet is gassed with cold nitrogen gas of the order of 5,000 pounds per square inch pressure. It may be of advantage, in order to shorten the gassing cycle, to use warm gas, perhaps as warm as 150 to 180 degrees Fahrenheit but not as high as to cause further vulcanization. This warm gas is suggested only for thick gages where the gassing time is extremely long. A certain amount of heat will also be instrumental in supporting the expansion of the sheet when removed from the gassing chamber since the rubber during the gas expansion from high pressure to atmospheric pressure would undergo a considerable cooling off.

Up to now, sheet material of random length and slightly varying width has been made with my 5 step process. It can be made at less cost since one of the most expensive operations, i. e., the finishing cure between press platens, has been eliminated and no other added.

Such cellular sheets will also show more snap because the cells are filled with gas above atmospheric pressure, a condition which is not realized with sheet made by the two-stage process.

These sheets may be used in the trade "as is" for many articles by cutting up the sheet and further processing; a smooth skin and straight edges are of little importance.

If specific finishing is desired, the following step is added. It is no second-stage vulcanization, and no such is contemplated, but it comprises the process of imposing a design or relief upon the cellular blank sheet. This can be done by means of a superheated matrix allowed to act upon the surfaces of the sheet a very short time (approximately 10 to 20 seconds). During this spell, no further vulcanization takes place, nor is the cellular rubber thereby expanded by virtue of the low heat conducting factor of the cold sheet.

The action had by the impression of a pattern is a slightly destructive one creating a thin skin which will permanently retain the design relief of the matrix.

In the foregoing, I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. The process of preparing a soft closed cell cellular sheet comprising the steps of pre-curing a soft rubber mix to final vulcanized condition, subjecting the vulcanized rubber to gas under pressure to impregnate the rubber with gas, and relaxing the pressure to permit the gassed rubber to expand.

2. The process of making closed cell cellular rubber sheet of the soft variety by extended mastication of rubber to increase stretch, calendering and plying into solid sheet, fully curing the sheet to soft rubber consistency, externally gassing the fully vulcanized sheet under high pressure of nitrogen gas and expanding the sheet.

3. The process of making closed cell cellular soft rubber sheet by extended mastication of raw rubber, calendering and plying rubber into solid sheets of desired gage, fully vulcanizing the sheet to the consistency of soft rubber, externally gassing the fully vulcanized solid sheet under high gas pressure of nitrogen of the order of 5,000 pounds per square inch and higher and of a temperature below the vulcanizing temperature of the rubber to promote expansion; and expanding the cellular sheet.

4. The process of making closed cell cellular soft rubber sheet by extended mastication and plasticizing of rubber to increase stretch, calendering and plying the compound into solid sheet of desired gage, vulcanizing the sheet to the consistency of soft rubber, externally gassing the vulcanized sheet under a high gas pressure of nitrogen of the order of 5,000 pounds per square inch or higher at a temperature below the vulcanizing temperature of the rubber to promote expansion, expanding the vulcanized and gassed rubber to a closed cell cellular sheet, cutting the desired figure from the sheet and impressing a pattern upon the sheet by means of a superheated matrix for a relatively short period of time sufficient to cause a permanent relief but insufficient to cause further vulcanization and further expansion.

HANS PFLEUMER.

REFERENCES CITED

The following references are of record in the file of this patent:

UNITED STATES PATENTS

| Number | Name | Date |
|---|---|---|
| 97,880 | Chesterman | Dec. 14, 1869 |
| 1,501,791 | Marshall | July 15, 1924 |
| 1,823,335 | Richert | Sept. 15, 1931 |
| 2,071,647 | Miller | Feb. 23, 1937 |
| 2,335,649 | Cooper | Nov. 30, 1943 |
| 2,404,171 | Hamilton | July 16, 1946 |
| 2,449,390 | Kirby | Sept. 14, 1948 |